United States Patent [19]

Colberg

[11] 4,270,428
[45] Jun. 2, 1981

[54] KERF GUIDE AND CAUTIONARY MARKER FOR A POWER DRIVEN TOOL

[75] Inventor: Richard A. Colberg, Lititz, Pa.

[73] Assignee: Black & Decker Inc., Newark, Del.

[21] Appl. No.: 60,380

[22] Filed: Jul. 25, 1979

[51] Int. Cl.³ ............................................... B27B 5/22
[52] U.S. Cl. .................................... 83/477.2; 83/522; 144/3 R
[58] Field of Search ...................... 83/477.2, 478, 522, 83/437; 144/3 R, 3 N

[56] References Cited

U.S. PATENT DOCUMENTS

| 2,750,970 | 6/1956 | Gaskell | 83/478 |
| 3,901,498 | 8/1975 | Novak | 83/477.2 X |

OTHER PUBLICATIONS

Sears Owners Manual–Part #62588, Cover, p. 22 & Back Cover, Published 9/1977.

Primary Examiner—Willie G. Abercrombie
Attorney, Agent, or Firm—Leonard Bloom; Edward Murphy; Harold Weinstein

[57] ABSTRACT

There is described a kerf guide and cautionary marker device for use with a power tool, particularly one employing a cutting type rotating tool, which guide and marker includes a groove cut into the table top of the apparatus. The groove extends linearly from the front edge of the tool opening towards the front edge of the table top. Disposed in the groove is a colored material, such as polystyrene, which has an exposed surface which can receive a scribe mark and/or cautionary instructions. The contrasting color between the inserted material and the surrounding table top alerts the operator to the fact that he is approaching the rotating tool. The operator aligns the guide mark on the work piece with the scribe mark on the material disposed in the groove and is thus able to properly position his work for the subsequent cutting operation.

If desired, a second groove, in line with the first groove, is disposed in the table top behind the tool and extends linearly from the rear edge of the tool piece opening to the rear edge of the table. Colored material is disposed therein, and the exposed surface of the material can have cautionary instructions marked thereon.

8 Claims, 5 Drawing Figures

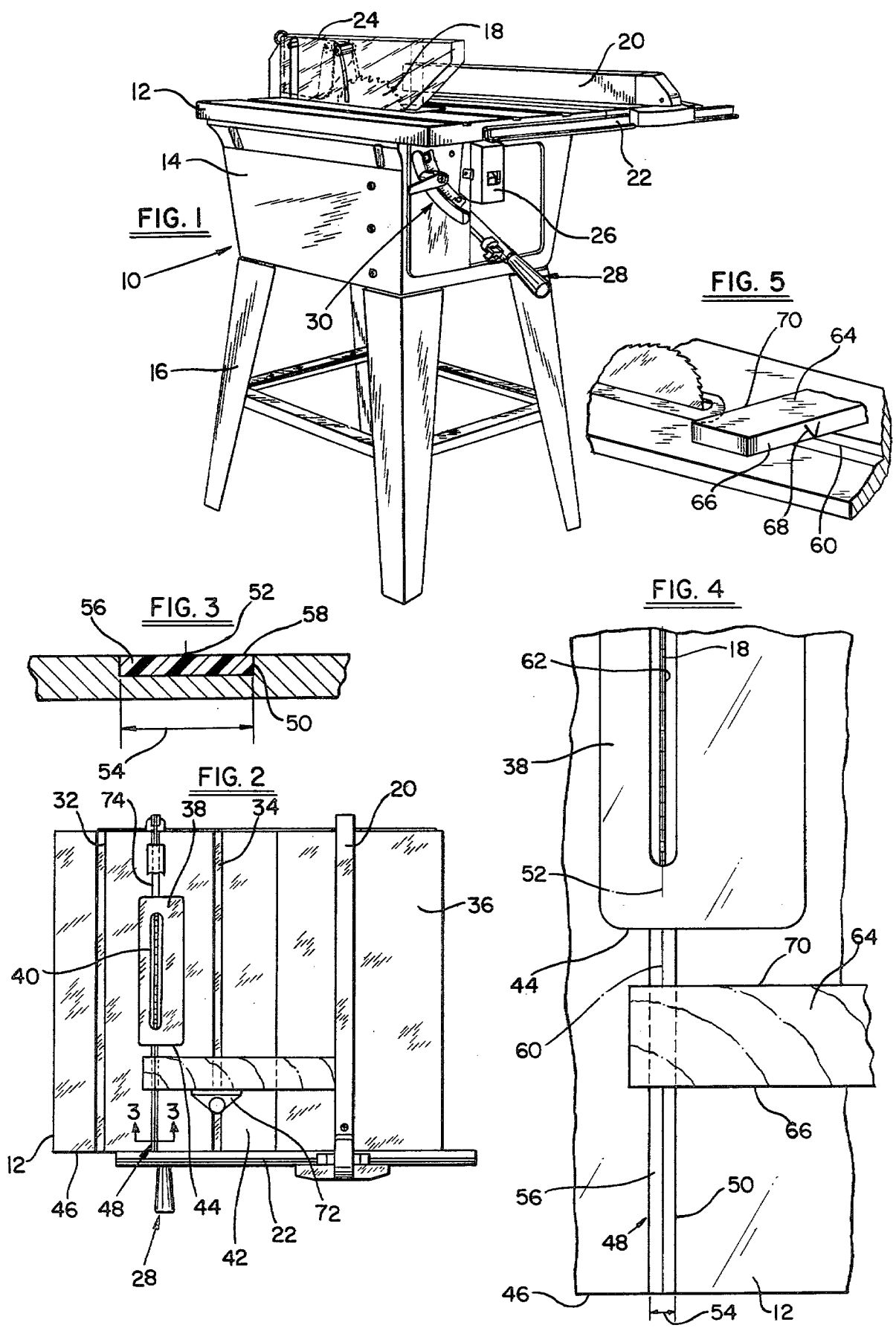

KERF GUIDE AND CAUTIONARY MARKER FOR A POWER DRIVEN TOOL

FIELD OF THE INVENTION

This invention relates to a kerf guide for a power tool apparatus and more particularly to a guide and cautionary marker for an apparatus employing, generally, a cutting tool such as a saw blade.

BACKGROUND OF THE INVENTION

In woodworking, as in other types of material cutting, it is often essential that close dimensions be held, or that workpieces of uniform size be cut. For power tool apparatus, such as a table saw, the alignment of the workpiece, particularly for cross cuts and miter cuts is a relatively difficult task. Heretofore, the accepted way was to draw a scribe line on the workpiece and the operator then guided the workpiece into the cutting path of the blade. Because of the placement of the cutting blade substantially back from the front edge of the table, the operator would still have to "eye-ball" the beginning of the cut and then push the workpiece on through for a complete cut. The difficulty in lining up the guide mark with the tool, often times resulted in numerous trial cuts with attending waste and loss of time.

A kerf guide or gauge is described in U.S. Pat. No. 2,750,970. As disclosed, this is essentially a mechanical device which, in considering the present invention, is complex and appears to be expensive. Further, it is known in table saws to utilize a circular disc of material disposed in close proximity to the table top opening through which the sawblade penetrates. It has limited application in that it may be easily covered by various standard widths of workpiece, and it does not provide the cautionary function available with the present invention.

It is therefore a primary object of this invention, to provide an arrangement offering a kerf guide feature for an increased number of standard widths of workpieces, together with a cautionary marker feature which alerts the operator to the area of the table top whereat the cutting tool is present.

It is another object of this invention to provide an inexpensive kerf guide which facilitates various cutting operations such as cross cuts and miter cuts.

It is still another object of this invention to provide a kerf guide which is adaptable to provide varying guide marks so as to accommodate the various cutting blade thicknesses or cutting tool devices which normally can be utilized in such power tools.

SUMMARY OF THE INVENTION

Towards the accomplishment of these and other objects which will become apparent from a consideration of the drawings and accompanying description, there is disclosed a kerf guide and cautionary marker device for a power tool apparatus including a table top having an opening through which a tool can pass which device comprises a groove in the table top, the groove extending linearly from, approximately, the front edge of the tool opening to the front edge of the table top. Disposed in the aforedescribed groove is a material having a color which is in contrast to, at least, the portion of the table top immediately surrounding the groove and the tool opening. This material has an exposed surface which can receive a scribe mark, the exposed surface is further conducive to the easy removal of the scribe mark when the operator so desires.

Additionally, there can be provided a second groove in the table top, the second groove extending linearly from approximately the rear edge of the tool opening to, the rear edge of the table top. The second groove is in line with the first groove. Material is inserted in said second groove having a color which, again is in contrast to the immediately surrounding table top area. The surface of this material can be marked with appropriate cautionary instructions.

BRIEF DESCRIPTION OF THE DRAWINGS

FIG. 1 is a perspective view of a power tool apparatus employing the kerf guide and marker of the present invention.

FIG. 2 is a plan view of the table top portion of the apparatus shown in FIG. 1.

FIG. 3 is a sectional, elevation view taken along lines 3—3 of FIG. 2.

FIG. 4 is a magnified view of a portion of the table top seen in FIG. 2 with a workpiece in place.

FIG. 5 is a perspective view looking along the top surface of the table top and demonstrating the alignment that is made by an operator employing the present invention.

DESCRIPTION OF THE PREFERRED EMBODIMENT

Referring to FIG. 1, there is seen a power tool device 10 which utilizes the principles of the present invention. A typical device, would be a table saw apparatus. The device is seen to include a table top portion 12 disposed upon an appropriate housing 14 which is mounted on stand 16. The apparatus includes a tool such as a saw blade 18.

Disposed along the top surface of the table top is a rip fence 20 which is slideably mounted in fence guide 22.

Power box 26 is connected between an appropriate source of electrical power (not shown) and the tool drive means contained within the enclosure 14. The tool elevation setting mechanism is shown generally at 28. For apparatus having bevelling capability, such means are provided generally at 30 and a guard and splitter arrangement 24 is mounted so as to move to accommodate the bevel angle.

Referring now to FIG. 2, the table top is seen to include miter gauge grooves 32 and 34. The table top 12 is seen to include one or more extension pieces 36 needed to accommodate larger workpieces.

Inserted in the table top at the point of the tool is the table top plate insert 38 which has an appropriately sized tool opening 40.

The work surface area 42 of the table top is, typically, a metallic finish which results from the machine-ground operation typically performed on the work table surface. The table top can be molded plastic of suitable color. Plate 38 is of a contrasting color which often times, is a brilliant red.

Disposed between the front edge 44 of the plate insert 38 and the front edge 46 of the table top, is the kerf guide and cautionary marker 48. Referring to FIGS. 3 and 4, guide and marker 48 are seen to include a rectangularly shaped groove 50 extending linearly and running the length between the front edge 46 of the table top and the front edge 44 of the plate insert 38. The disposition of the groove on the table top is such as to be substantially, axially aligned, throughout its length with the center line 52 of the cutting path of the tool. Stated otherwise, the sawblade 18 defines a plane and the groove 50 intersects this plane.

The width 54 of the groove 50 is seen to be such that it is disposed on either side of the path center line 52. The width from the line 52 to either edge of the groove, generally, will be at least that necessary to ensure that a scribe mark can be struck for the widest, individual tool expected to be used on the apparatus. Of course the width 54 of the groove 50 can be larger to accommodate multiple, mounted tools for dado cuts and the like.

The depth of the groove 50 is cut to the necessary minimum for the thickness of the material to be inserted, while still maintaining a flush tabletop surface condition. The material, 56, is disposed in the groove for the entire length thereof.

Typically the material used is a plastic, such as polystyrene, which is cemented or otherwise secured in the groove. The material is colored so as to be in contrast with the color of the table top and plate insert, 38. For example, yellow or Federal Gold, have been found to provide necessary contrast with typical, table top finishes. The color is chosen so as to quickly focus the operator's attention to the danger area, alerting him to the need for care around the tool. It must also provide sufficient contrast with a pencil scribe mark.

The exposed surface, 58, of the material has a finish, such as matte, which makes it conducive to accepting a scribe mark such as made by a pencil. Further the surface condition, desirably, is such so as to prevent unintended removal of the mark, requiring the operator's intentional act to remove it.

Consider FIGS. 4 and 5 for a discussion of the utilization of the present invention. The operator would have previously scribed mark 60 on the surface 58 by placing a straight edge along one side surface of the tool piece 18 say for example, side surface, 62. The mark, generally, is scribed along the full length of the insert material or, at least, the length of the straight edge. This one time scribing, is generally all that is needed for operations employing the same toolpiece. (Of course, the mark is checked periodically to ensure its continued alignment with the tool).

Prior to its placement on the work table surface, the operator will have marked his workpiece 64 with a guide mark. Normally, the front or rear edge is marked. For purposes of the present invention it is of little consequence which is marked. Presume he has marked the rear edge 66 with guide mark 68. He then places the workpiece on the tabletop and aligns mark 68 with the scribe line, 60. He then moves the workpiece towards the tool piece 18, taking care that the mark 68 is continually aligned with scribe line 60. The front edge 70 of the workpiece is cut; and, the operation completed by urging the workpiece ahead. By maintaining the workpiece free from movement in relation to a miter gauge 72 which would, for example, be disposed in groove 34, the operator can finish the cut as desired.

In addition, to the front edge guide and cautionary marker, FIG. 2 shows that an additional cautionary marker 74, can be employed running from the rear edge of the plate insert 38 to the rear edge of the table. This typically, comprises a similar groove and insertable material construction as described above for kerf guide and marker 48. Cautionary instructions such as "DO NOT FEED MATERIAL FROM THIS END", and the like, can be printed or otherwise marked on the surface of the material as desired. Of course, if desired, cautionary markings or instructions could be marked on the material in the front edge groove.

Although the present invention has been described in combination with a table saw device, it is within the scope of the present invention, that it have application to power tool apparatus employing different tools.

It is understood, of course, that the above is but an illustration of the principles of the present invention and that, in fact, the scope thereof is only to be limited by the breadth of the appended claims.

What I claim is:

1. A power tool apparatus having a housing, drive means mounted in the housing, and a tool connected to the drive means, comprising:
   (a) a table top having a front edge mounted on the housing, and having a first surface lying in a plane,
   (b) a linear groove formed in the first surface,
   (c) a tool opening having an insert aperture through which the tool is extendable, formed in the first surface and intersecting the groove,
   (d) cautionary material inserted in the groove and having a second surface lying in the plane of the first surface,
   (e) the second surface capable of receiving a scribe mark and having a color contrasting with the color of the table top adjacent the groove, whereby a workpiece may be aligned with the tool along the second surface and an operator is alerted to the tool's cutting path,
   (f) the linear groove extends to the front edge, and
   (g) the second surface extends the length of the groove.

2. The combination claimed in claim 1 wherein:
   (a) the table top further includes a rear edge,
   (b) the linear groove extends from the front edge to the rear edge, and
   (c) the second surface extends from the insert aperture the length of the groove.

3. The combination claimed in claim 1 wherein:
   (a) the groove has a rectangular cross-section, and
   (b) the surface of the cautionary material is capable of receiving a removable scribe mark.

4. The combination claimed in claim 3 wherein:
   (a) the power tool apparatus is a table saw, and
   (b) the second surface is plastic and is capable of receiving an erasable pencil scribe mark.

5. A power tool apparatus having a housing, drive means mounted in the housing, and a tool connected to and driven by the drive means, comprising:
   (a) a table top mounted on the housing and having a front edge, a rear edge and a surface lying in a first plane,
   (b) an insert aperture formed in the table top surface,
   (c) a plate insert mounted in the insert aperture and defining a tool opening through which the tool is extendable in a first axis,
   (d) a groove formed in the surface of the table top linearly extending from the front edge of the table top to the insert aperture along a second axis intersecting the tool opening and the first axis, and further linearly extending along the second axis from the insert aperture to the rear edge,
   (e) cautionary material inserted in the groove along its length and having a surface lying in the first plane, and
   (f) the surface of the cautionary material being capable of receiving a scribe mark and having a color contrasting with the color of the table top adjacent the groove, whereby a workpiece may be aligned with the first axis at any point along the groove, and an operator is alerted to the tool's cutting path.

6. The combination claimed in claim 5 wherein:
(a) the groove has a rectangular cross-section, and
(b) the surface of the cautionary material is capable of receiving a removable scribe mark.

7. The combination claimed in claim 6 wherein:
(a) the power tool apparatus is a table saw, and
(b) the surface of the cautionary material is capable of receiving an erasable pencil scribe mark.

8. The combination claimed in claim 7 wherein:
(a) the cautionary material is plastic,
(b) cautionary markings are formed at the surface of the cautionary material.

* * * * *